Aug. 23, 1932.  E. JAMES  1,873,590

PIPE CONNECTION

Filed May 11, 1928

Edward James
Inventor
by Smith and Freeman
Attorneys

Patented Aug. 23, 1932

1,873,590

UNITED STATES PATENT OFFICE

EDWARD JAMES, OF CLEVELAND, OHIO, ASSIGNOR TO HAROLD ELNO SMITH, OF CLEVELAND HEIGHTS, OHIO

PIPE CONNECTION

Application filed May 11, 1928. Serial No. 276,858.

This invention relates to pipe connections and has for its object the provision of new, improved and simplified means for connecting together two pipes in leak-proof relation, while permitting ready separation thereof, and allowing a considerable degree of relative movement therebetween. Another object of the invention is the provision of new and simplified means for coupling two pipes together without threading, soldering, cementing, or deforming the same, and is specially applicable to pipes of such thickness that threads cannot conveniently be formed thereon.

In my accompanying application, filed May 11, 1928, Serial No. 276,859 I have shown my improvements as applied to the particular problem of connecting together the engine and radiator of an internal-combustion-engine propelled vehicle. The present application relates to the general problem and shows the pipe coupling either in the single form or in the double form, as applicable to gas pipes, water pipes, air pipes, oil pipes, electric conduits, and in any other relations where a cheap, simple, flexible pipe joint is desired.

Figure 1:
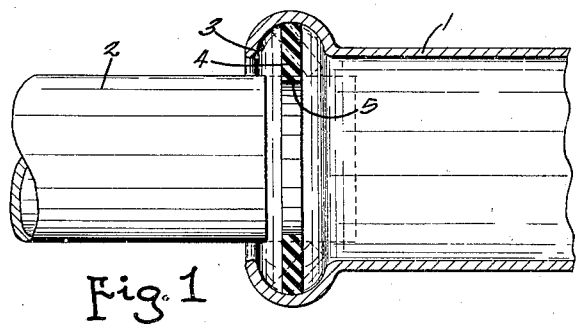
Figure 3:
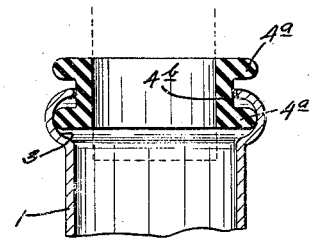
Figure 2:
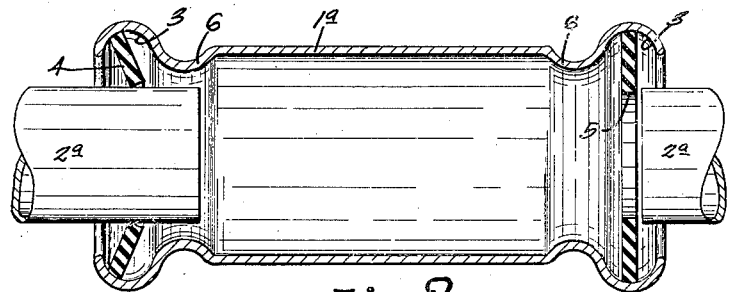
Figure 4:
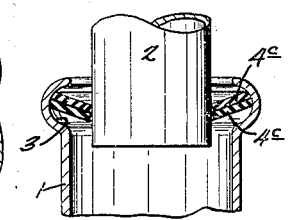
Figure 5:
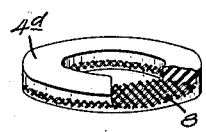
Figure 6:
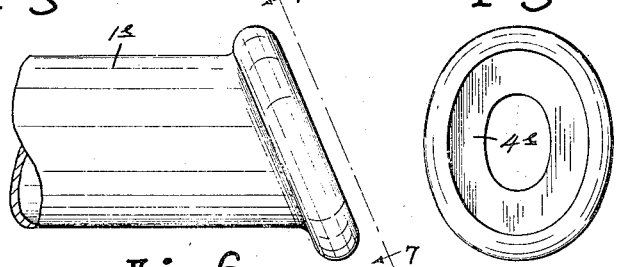
Figure 7:
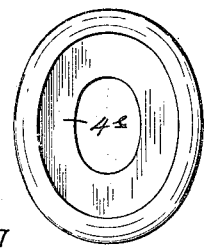
Figure 8:
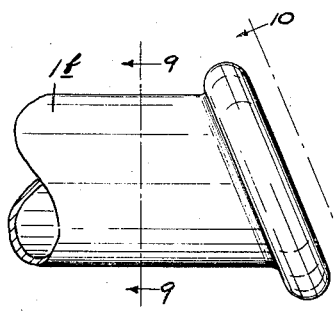
Figure 9:
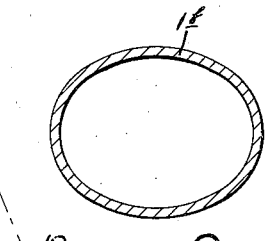
Figure 10:
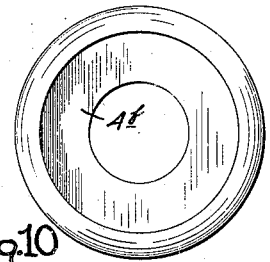

In the drawing accompanying and forming a part of this application I have shown certain illustrative embodiments of my invention, but without intent to limit myself thereto. Fig. 1 illustrates my inventive idea in its simplest form; Fig. 2 illustrates a modification thereof, including a duplication of the connector at each end of a coupling tube; Figs. 3 and 4 illustrate slight modifications in the gasket or packing element; Fig. 5 illustrates another form of packing devised especially for electric conduit use; Fig. 6 is a side elevation and Fig. 7 a corresponding end elevation showing the modification of my pipe joint wherein the member is cut obliquely; Fig. 8 is a side elevation of the end portion of another modification; and Figs. 9 and 10 are respectively a cross-section and an end-elevation corresponding to the lines 9—9 and 10—10 of Fig. 8.

My improvement comprehends the use of two mating pipe elements, a receiving element 1 and an entering element 2. At its mouth end the receiving element is enlarged interiorly to produce a round-bottomed, or slant-sided circumferential groove or recess 3 in which is sprung a packing-ring or gasket 4 of elastic flexible material, for example fibrous material like cotton, hemp hair, asbestos, wire, etc., mixed and vulcanized with rubber, oil, or some gum; or vulcanized fiber or even thin laminated sheets of flexible metal or screen cloth.

The entering member 2 is preferably also cylindrical in shape, but of such size as to slip freely into the interior of the element 1, but its external diameter is slightly larger than the diameter of the aperture 5 with which the gasket or packing ring is formed. As a result therefore, even though the gasket or packing ring is flat to start with the insertion of the element 2 deforms the same from its original flat shape to a flaring or dished shape shown in dotted lines in Fig. 1, which causes its smaller end to grip tightly the end of the element 2 and its larger end to become displaced around the bottom wall of the recess 3. As a result, the member 2 is gripped tightly, and leakage between the two pipes prevented, while withdrawal of the element 2 is opposed by the gripping effect of the gasket, although further insertion is easy. However, withdrawal can be effected upon relative twisting.

In Fig. 2 I have shown my improvements as duplicated upon opposite ends of the receiving element or connecting sleeve 1ª which is thereby enabled to secure together two spaced pipes 2ª which are more or less aligned. To do this the member 1ª is first slipped over one of the pipe ends in an obvious manner until the second pipe end is clear, then brought into alignment with the second pipe end and shifted lengthwise generally with a twisting movement, until connections are effected at that end.

Among the advantages of my improvements are that no threading is necessary; that accidental unfastening is so unlikely as to be substantially impossible owing to the fact that onward movement is easier than off-movement; and that the different pipes to be connected need not be in line with each other or at any special distance apart. A great deal of latitude is permissible in the width and curvature of the groove 3, although I prefer to have the groove considerably wider than the thickness of the gasket, which both facilitates the insertion of the gasket, renders its escape more difficult, and enables it to assume a free position of angularity. The radial diameter of the gasket is preferably slightly greater prior to insertion than the radial diameter of the recess. In Fig. 1 I have shown the groove 3 as formed merely by rolling or swaging outwardly the walls of the tube; in Fig. 2 I have shown the groove 3 adjacent an inwardly displaced portion 6. This last is desirable in case the metal of the tube is lacking in ductility since it is easier to produce the groove with the compound curve shown in Fig. 2 than with the simple curve shown in Fig. 1.

Many minor variations are readily possible. Thus in Fig. 3 I have shown the gasket as having two spaced circular portions $4^a$—$4^a$ connected by a cylindrical body portion $4^b$. One of the circular portions fits inside the groove 3 and the other overlaps the end thereof to prevent the entrance of foreign matter, and also sometimes to prevent accidental mechanical contact between the tubular members such as might close an electric circuit. In Fig. 4 I have shown two separate gasket rings $4^c$—$4^c$ located side by side in contact with each other. In Fig. 5 I have shown a gasket $4^d$ having its interior traversed by a metallic webbing or net work 8 adapted to reinforce the same and also at all times to connect the inner and outer members electrically as is sometimes desired for signalling purposes or for electric conduit work. It is also within my invention to coat the gasket exteriorly with screen cloth or sheet metal or galvanically deposited metal, or of alternating sheets of metallic and non-metallic substances thus shielding the gasket material against corrosive or softening action.

Sometimes in order to facilitate assembling and oppose separation it is desirable to cut the end of the pipe obliquely as shown in Fig. 6. When the pipe itself is circular the end thereof thereby becomes oval as shown in Fig. 7 and the gasket $4^e$ also becomes oval, although obviously the same will fit snugly the exterior of a pipe which is parallel to the receiving member. However, if the pipe itself be oval as shown at $1^f$ in Figs. 8 and 9 and the end cut obliquely at the proper angle relative thereto, said end will produce a perfect circle as shown in Fig. 10 and the gasket $4^f$ thereof will either fit a cylindrical pipe perpendicular to its own plane or an oval pipe parallel to the first pipe.

It will be understood that many other modifications of my central idea can be made and that my improved pipe coupling is applicable to a great many technical uses so that I do not limit myself in any wise except as specifically recited in my several claims which I desire may be construed broadly, each independent of limitations contained in other claims.

Having thus described my invention what I claim is:

1. A detachable, flexible pipe connection comprising a receiving member having at its end a round-bottomed, inwardly-facing, circumferential recess, an annular disk-shaped gasket of soft and yielding material having a thickness less than the width of said recess and a normal external diameter greater than the internal diameter of said receiving member and recess, and an entering member smaller than said receiving member and adapted to enter the same, said gasket having an aperture therethrough which is normally slightly smaller than the external diameter of said entering member.

2. A detachable, flexible pipe connection comprising an entering member and a receiving member, the latter having a slant-sided inwardly-facing circumferential recess surrounding said entering member, and a dished gasket of yielding material tightly embracing the entering member and having its periphery braced against the wall of said recess.

3. A detachable, flexible pipe connection comprising a receiving member, and an entering member telescoped therein, said receiving member having near its end an inwardly facing circumferential recess which surrounds the entering member, in combination with a yielding annular disk-shaped gasket embracing said entering member and having a circumferentially projecting portion projecting into and braced against the wall of said recess, the width of said recess being greater than the thickness of said circumferentially projecting portion.

4. A detachable, flexible pipe connection comprising a receiving member having near its end an inwardly facing circumferential recess, and an annular gasket of elastic flexible material located in said recess, the free external diameter of said gasket being greater than the internal diameter of said receiving member and recess, and the thickness of the circumferential portion of the gasket being less than the width of said recess, in combination with an entering member having an external diameter less than that of the receiving member and only slightly greater than the normal opening in the gasket.

5. In a detachable, flexible pipe connection, a receiving member having an inwardly facing circumferential recess at its end, an entering member telescoped inside said receiving member, and an elastic annular gasket of dished shape tightly surrounding said entering member and having its circumferentially projecting portion narrower than said recess.

6. In a detachable, flexible pipe connection, a receiving member having an inwardly-facing circumferential recess at each end, a dished disk gasket of elastic material having its marginal edge braced against the wall of each recess and having its faces spaced from the walls of said recess, and an entering member tightly embraced by each gasket and spaced from the wall of said receiving member.

In testimony whereof I hereunto affix my signature.

EDWARD JAMES.